United States Patent
Zhou et al.

(10) Patent No.: US 9,552,367 B2
(45) Date of Patent: *Jan. 24, 2017

(54) SYSTEM AND METHOD FOR NETWORK FILE SYSTEM SERVER REPLICATION USING REVERSE PATH LOOKUP

(71) Applicant: CA, Inc., Islandia, NY (US)

(72) Inventors: Dongmei Zhou, Jiang Xi Province (CN); Guoxian Shang, Beijing (CN); Baojian Chang, Beijing (CN)

(73) Assignee: CA, Inc., New York, NY (US)

( * ) Notice: Subject to any disclaimer, the term of this patent is extended or adjusted under 35 U.S.C. 154(b) by 1094 days.

This patent is subject to a terminal disclaimer.

(21) Appl. No.: 13/661,881

(22) Filed: Oct. 26, 2012

(65) Prior Publication Data
US 2014/0122428 A1 May 1, 2014

Related U.S. Application Data (63) Continuation of application No. 13/234,532, filed on Sep. 16, 2011, now Pat. No. 8,301,597.

(51) Int. Cl.
*G06F 17/30* (2006.01)
*G06F 11/20* (2006.01)

(52) U.S. Cl.
CPC ....... *G06F 17/30179* (2013.01); *G06F 11/202* (2013.01); *G06F 11/2038* (2013.01); *G06F 11/2048* (2013.01); *G06F 11/2097* (2013.01)

(58) Field of Classification Search
None
See application file for complete search history.

(56) References Cited

U.S. PATENT DOCUMENTS

| | | | |
|---|---|---|---|
| 5,151,989 A | 9/1992 | Johnson et al. | 395/600 |
| 5,944,789 A | 8/1999 | Tzelnic et al. | 709/214 |
| 6,029,168 A | 2/2000 | Frey | 707/10 |
| 6,081,807 A | 6/2000 | Story et al. | 707/101 |
| 6,535,970 B1 | 3/2003 | Bills et al. | 711/207 |

(Continued)

OTHER PUBLICATIONS

Butt, Ali Raza, et al.,"Kosha: A Peer-to-Peer Enhancement for the Network File System", Proceedings of the ACM/IEEE SC2004: High Performance Computing, Networking and Storage Conference, Nov. 6-12, 2004, 11 pages.

(Continued)

*Primary Examiner* — Wilson Lee
(74) *Attorney, Agent, or Firm* — Pillsbury Winthrop Shaw Pittman LLP (57) ABSTRACT

The system and method described herein may use reverse path lookup to build mappings between file handles that represent network file system objects and full path names associated therewith and distinguish hard links between different file system objects having the same identifier with different parents or file names. The mappings and information distinguishing the hard links may then be cached to enable replicating changes to the file system. For example, a server may search the cached information using a file handle associated with a changed file system object to obtain the file name and full path name associated therewith. The server may then send the file name and full path name and metadata describing how the file system object was changed to a replica host, which may then replicate the change to the file system object.

20 Claims, 3 Drawing Sheets

(56) References Cited

U.S. PATENT DOCUMENTS

| | | | |
|---|---|---|---|
| 7,243,089 B2 * | 7/2007 | Becker-Szendy | G06F 17/30067 |
| 7,272,654 B1 | 9/2007 | Brendel | 709/229 |
| 7,283,991 B1 | 10/2007 | Kimmerly | 707/3 |
| 7,428,556 B2 | 9/2008 | Kime | 707/200 |
| 7,490,074 B1 | 2/2009 | Leonard et al. | 707/1 |
| 7,587,426 B2 | 9/2009 | Fujiwara et al. | 707/200 |
| 7,653,699 B1 * | 1/2010 | Colgrove | G06F 17/30067 |
| | | | 709/213 |
| 7,809,776 B1 | 10/2010 | Witte et al. | 707/825 |
| 7,877,511 B1 | 1/2011 | Berger et al. | 709/242 |
| 8,301,597 B1 | 10/2012 | Zhou et al. | 707/626 |
| 2004/0133608 A1 | 7/2004 | Saake et al. | 707/200 |
| 2006/0106827 A1 | 5/2006 | Brown et al. | 707/100 |
| 2006/0161678 A1 | 7/2006 | Bopardikar et al. | 709/238 |
| 2009/0112879 A1 * | 4/2009 | Oliveira | G06F 17/30067 |
| 2009/0271418 A1 | 10/2009 | Vaghani et al. | 707/100 |
| 2011/0016085 A1 | 1/2011 | Kuo et al. | 707/615 |
| 2011/0137966 A1 * | 6/2011 | Srinivasan | H04L 67/1097 |
| | | | 707/828 |
| 2011/0191294 A2 | 8/2011 | Sudhakar | 707/638 |
| 2011/0276578 A1 | 11/2011 | Allalouf et al. | 707/755 |
| 2012/0233418 A1 * | 9/2012 | Barton | G06F 17/30575 |
| | | | 711/162 |

OTHER PUBLICATIONS

NFS: Network File System Version 3 Protocol Specification, Sun Microsystems, Feb. 16, 1994, 98 pages.
Network File System (NFS) Version 4 Protocol, by S. Shepler et al., The Internet Society, Apr. 2003, 275 pages.
Zhu, Ningning, et al., "An NFS Trace Player for File System Evaluation", 14 pages.

* cited by examiner

SYSTEM AND METHOD FOR NETWORK FILE SYSTEM SERVER REPLICATION USING REVERSE PATH LOOKUP

FIELD OF THE INVENTION

The invention generally relates to a system and method for network file system server replication, and in particular, to using reverse path lookup to map file handles that represent file objects in a network file system with full path names associated with the file objects, detect and distinguish hard links between different file objects that have the same identifiers with different parents or different names within the network file system, and cache results from mapping the file handles with the full path names and distinguishing the hard links to enable replicating changes to the network file system.

BACKGROUND OF THE INVENTION

Today, many (if not all) organizations tend to conduct substantial amounts of business electronically, and consequently, depend on having reliable, continuous access to information technology systems, applications, and resources in order to effectively manage business endeavors. At the same time, information technology threats ranging from viruses, malware, and data corruption to application failures and natural disasters are growing in number, type, and severity, while current trends in technology have presented information technology departments with a plethora of recurring challenges. For example, the need to do business at an increasingly faster pace with larger critical data volumes have amplified the pressure on information technology, which has led to efforts to consolidate, migrate, or virtualize servers and resources hosted thereon without disrupting operations or damaging resources. As such, even isolated failures have the potential to render information technology resources unavailable, which may cause organizations to lose substantial amounts of revenue or information that could impede or even cripple business. Although certain organizations have attempted to utilize backup solutions to protect the information that applications create, many backup solutions lack the restoration granularity required to quickly restore important data, while other backup solutions demand full restoration to temporary disk space, even to recover a single file. Moreover, tape backup systems impose additional time burdens to find and mount the correct tape before the recovery process can even begin. Consequently, many organizations have turned to complementary solutions, including virtual snapshots, replication and continuous data protection systems, and high availability technologies to minimize downtime and protect critical applications and data.

However, because many applications are using new and emerging technologies, replication and backup solutions tend to leave many gaps in how to manage these technologies, while implementing separate point solutions typically results in significant cost and complexity. For example, many organizations have increasingly been adopting UNIX and Linux operating system implementations, which typically use the Network File System (NFS) protocol to provide client computers with transparent and remote access to shared file systems on a server over a network to meet local storage needs, but in actuality client computers and servers jointly perform every NFS operation. In particular, the NFS protocol uses a supporting mount protocol to perform operating-system functions that allow a client computer to attach remote directory trees to a point within a local file system, and the mount process further allows the server to grant remote access privileges to restricted client computers via export controls. In response to the remote server exporting the mount point that the client computer uses to mount the remote server file system, the server then passes file handles that represent file objects in the file system to the client computer, which uses the file handles to communicate with the server and perform all subsequent operations on the file system. Although NFS can provide many advantages to manage file system operations due to the design independent from underlying machines, operating systems, network architectures, and transport protocols used therewith, the mechanisms that the NFS protocol uses to represent file objects in the file system do not easily lend themselves to replication and backup solutions.

For example, NFS file handles are data structures that uniquely identify file objects within the file system, but the NFS file handles are typically encoded and decoded on the server, meaning that the NFS file handles are opaque to client computers (i.e., only the server can correctly interpret the file handles). In many NFS implementations, the file handle contains an inode number to index information about the represented file object, an inode generation number to add a history to the inode number, a device identifier that indicates where the file object resides, and if configured, parent information associated with the file object. However, NFS was designed to be a stateless protocol, meaning that the server only uses the file handle (inode number) to operate on the represented file object, which does not provide sufficient information to enable replication and backup operations. For example, continuous data protection products typically have a master host track changes to metadata associated with protected file objects. The master host then writes the tracked metadata changes to a journal file and sends the journal file to a replica host, which applies the changes to a replica of the protected file objects to maintain consistency with the master host. Importantly, all changes written to the journal file record a full path associated with any file objects that have been changed relative to the protected directory because the master host and the replica host may store the protected file objects under different directories. As a result, in order to replicate changes to a file object maintained on a master NFS host to another remote host, a replication component on the master host must translate the file handle associated with the changed file object into a full path associated with the file object.

However, as noted above, NFS servers only interpret NFS file handles to identify the inode number that indexes information about the file object, wherein the server uses the file inode number (without the file name) to perform all file system operations and pass results from the file system operations to the client computer. Thus, because the file handle typically only contains limited information about the file object (i.e., the inode number, inode generation number, and device identifier), the master NFS host cannot obtain the full path that the file object has within the file system. More particularly, directory entries in disk-based file systems essentially contain the name and inode number associated therewith, which enables a virtual file system kernel component to use the parent inode number associated with a current path component to perform a forward path lookup (i.e., the current path component and the parent inode number may be used to traverse the directory and locate the inode associated with the file object). The virtual file system may then cache a relationship between the inode and the name associated with the file object to accelerate subsequent disk lookups (i.e., once a particular path component has been resolved, ancestor information has already been cached, such that the kernel in a disk-based file system can link cached components together in order to obtain the full path associated with a file object). In contrast, because NFS has a stateless design in which the server only uses file handles to perform file system operations, NFS-based file systems lack a cached translation between the name and inode number associated with the file objects that are stored therein because the file handles alone fail to provide sufficient information to build the full file path. Further detail noting difficulties to replicate file systems that implement NFS due to clients and servers potentially having different path name mappings and consequently inconsistent images of the file name space are described in "NFS: Network File System Version 3 Protocol Specification," the contents of which are hereby incorporated by reference in their entirety.

Moreover, another issue that interferes with suitably performing replication and backup on file systems that implement the NFS protocol relates to "hard links," which generally refer to different file objects within the file system having identical inode numbers but potentially different parents or file names. In other words, file systems implemented on NFS may contain hard links that represent multiple entry points to the same data, whereby an operation that applies changes or modifications to one hard linked file object may result cause the changes or modifications to be unintentionally imputed to the other hard linked file objects. In replication contexts, all hard links to the same file object must therefore be protected in one replication scenario because replicating the hard links in separate synchronization or replication scenarios would result in the hard links becoming normal file objects such that the multiple entry points to the same data would be lost. Furthermore, any subsequent changes to the previously hard linked data cannot be captured and automatically applied to any hard links that were not synchronized in the replication scenario (i.e., once the replication scenario begins, the master host would be unable to create the hard link between cross root directories). Moreover, NFS permits hard links on file objects that represent directories within the file system, which can potentially result in a hard link between different root directories in different file systems. Thus, the hard link problem interferes with suitable replication and backup because hard linked directories would lead to inconsistent parent directory entries and hard links undermine the operating system independence associated with the NFS protocol because most operating systems lack support for the notion of a hard link, among other reasons.

SUMMARY OF THE INVENTION

According to one aspect of the invention, the system and method described herein may use reverse path lookup to build mappings between file handles that represent file objects in a network file system and full path names associated with the file objects. Further, the system and method described herein may distinguish hard links that relate to different file objects having the same identifier with different parents or different file names. As such, the mappings between the file handles and the full path names may then be stored in a cache in addition to any information that may distinguish the hard links to enable replicating changes to the file system. For example, a master host may generally track operations on the file system to detect changes to one or more file objects within the file system. In response to determining that one or more file objects within the file system have been changed, the master host may then search the cache using a file handle associated with the changed file objects to obtain the file name and full path name associated therewith. The master host may then combine the file name and the full path name and write the combined file name and full path name to a journal file in addition to metadata that describes how the file objects were changed. The master host may then send the journal file to a replica host, which may replicate the changes to the file objects.

According to one aspect of the invention, the system and method described herein may include a client computer communicating with the master host to transparently and remotely access the master file system, wherein the client computer may mount directory trees associated with the master file system within local storage and jointly perform operations on the master file system with the master host. For example, the master host may generally pass file handles that represent file objects in the master file system to the client computer, which then uses the file handles and information mounted in the local storage to perform operations on the master file system jointly with the master host. The master host may then track activity that relates to the client computer operations on the master file system to detect changes to file objects within the master file system and replicate the changes on a replica host. For example, to replicate the changes on the replica host, the system and method described herein may validate consistency between the master file system and a replica file system that provides a copy associated with the master file system on the replica host. In particular, the master host may invoke a replication client to record metadata describing the changes in a journal file, which may be sent to the replica host to replicate the changes in the replica file system. Furthermore, the changes applied to the master file system and replicated on the replica file system may be recorded in a rewind log to preserve a context that can be used to rewind or otherwise undo the changes within the master file system and/or the replica file system or locate a switch point on the replica file system that can be used to suitably resume business operations in response to a disaster or other failure associated with the master file system, thereby ensuring that the master file system will be available in emergency or other failure scenarios that cause data loss or disruption.

According to one aspect of the invention, the system and method described herein may include the master host using various mechanisms to represent the file objects managed within the master file system in a manner that can ensure the replica file system and the master file system will have a consistent state that permits the above-described replication and rewind operations. For example, as noted above, the master host generally passes file handles that represent file objects in the master file system to the client computer, which then uses the file handles to perform any subsequent operations on the file objects. Although the file handles may generally contain all the information that the master host needs to distinguish an individual file object, the file handles are generally opaque to the client computer (i.e., only the master host can correctly interpret the contents associated with the file handles). As such, in response to the client computer sending changes associated with a file handle to the master host, the master host may interpret the file handles to apply the changes to a file object that the file handle represents and may generate information that the replica host can use to interpret the file handles and replicate the changes. For example, the master host may initially find an inode in the master file system that corresponds to the file handle and then use a reverse path lookup on the inode number associated with the file handle to determine the parent inode and the full path name associated with the file object, which the master host may add to the file handle to enable the replica host to correctly interpret the file handle and replicate the change in the replica file system.

According to one aspect of the invention, the reverse path lookup on the inode number may be used to determine the parent inode and the full path name associated with file handles that represent directories. For example, any file object that represents a current directory within the master file system will contain an entry named ". ." that points to the parent directory associated with the current directory. As such, the master host may simply read the ". ." entry to obtain the parent inode associated with the current directory and then traverse the parent directory to find the name associated with the current directory, which can also be considered the child associated with the parent directory. Furthermore, the master host may iteratively or recursively perform the reverse path lookup in the same or a substantially similar to find all ancestry information associated with the current directory (e.g., if the master host locates a ". ." entry in the parent directory, that ". ." entry may be read to obtain the grandparent associated with the current directory, any additional children associated with the grandparent, etc.). In this manner, the master host may translate the inode number associated with the current directory to the full path name associated therewith, and may further translate inode numbers associated with any other directories to full path names associated therewith to determine the full directory structure in the master file system.

According to one aspect of the invention, the reverse path lookup on the inode number may be used to further determine the parent inode and the full path name associated with file handles that represent regular (i.e., non-directory) files. For example, the master host may store the above-described translations between directory inode numbers and directory full path names in the cache, which may be referenced to determine the full path name that any file object has in the master file system and thereby enable replication operations. In particular, although inodes that represent regular (non-directory) files do not have a corresponding ". ." entry, the reverse path lookup may nonetheless determine the parent associated with the file inode in the same or a substantially similar manner to directory inodes. For example, any file having a "." file name may point to a current directory (i.e., the directory that contains the file), whereby the master host may similarly read the "." entry to obtain the parent inode number associated with any inode that represents a regular file. In this manner, the master host may similarly translate the inode number associated with a regular file to the parent inode number associated therewith the current file, wherein the translation may be stored in the cache and subsequently referenced to obtain the inode number to parent inode number translation and perform replication operations on the regular file.

According to one aspect of the invention, the master host may build the inode number to parent inode number mapping into a data structure that can then be stored within a mapping file to improve response time associated with subsequent replication operations. In particular, whenever the master host invokes the replication client to replicate or synchronize content in a directory, the master host may read the inode numbers and parent inode numbers associated with all regular files that the directory contains from the cache and write the inode number to parent inode number pairs to the mapping file. In one implementation, the master host may maintain various mapping files that correspond to individual devices, whereby all data within a particular mapping file may have the same device identifier. As such, every time the replication client tracks an operation that changes a file object in the master file system, the replication client may check the file handle associated with the file object against the appropriate mapping file based on the device identifier contained therein and return the inode number to parent inode number pair associated with the file object. As such, the master host may cache contents associated with the mapping files (or portions thereof) to improve response time associated with reading the inode number to parent inode number pairs. For example, the data structure used to cache the contents associated with the mapping files (or the portions thereof) may include a binary balance tree, commonly referred to as a B-tree, to allow the replication client use the file inode number and device identifier to search the B-tree, which sorts data to allow searches to be conducted quickly (i.e., in logarithmic amortized time).

According to one aspect of the invention, the system and method described herein may support hard links during replication to preserve file type and data content as-is in the replica file system (e.g., ensuring that any hard linked files in the master file system will be hard linked in the replica file system subsequent to the replication). In addition, if configured to enable the data rewinding mechanisms noted above, the replication client may capture events that relate to operations on the hard linked files during replication to ensure that when the hard linked files are replicated, corresponding undo journal events will also be created to rewind the events on the replicated hard linked files. As such, to enable replicating any hard links, which generally arise where different files have the same inode number but different parents or names, the master host may attempt to distinguish the hard linked files. In particular, the master host may determine whether the hard linked files reside in different directories, in which case the inode number to parent inode number pairs associated therewith may sufficiently distinguish the hard linked files because the hard linked files would have different parent inode numbers. However, if the hard linked files reside in the same directory, the parent inode numbers would identify the same parent directory, in which case the master host may add file names associated with the hard linked files to the entries in the mapping file to distinguish hard linked files that reside in the same directory (i.e., because entries in the mapping file would represent the hard linked files in three dimensions via their inode numbers, parent inode numbers, and file names and thereby distinguish the hard linked files. Further, any nodes in the B-tree that correspond to inode numbers shared among multiple hard linked files may list all the hard links together to simplify searches during replication.

According to one aspect of the invention, the system and method described herein may then use the B-tree data structure and/or the reverse path lookup mechanism to replicate changes to file objects in the master file system. For example, to perform an operation on a file object in the master file system, the client computer may pass the file handle associated therewith to the master host to identify the appropriate file object. The master host may then interpret the file handle to apply the operation, and in response thereto, the replication client may track the operation that the master host performs and use the inode number and device (or file system) identifier associated with the file handle to search the B-tree. In response to finding a node corresponding to the inode number, the replication client may return the parent inode number and file name associated with the file handle and check whether the parent inode number has been stored in the cache. If the parent inode number has been cached, the replication client may then determine whether the cached information associated with the parent inode number includes the full path name associated therewith. If so, the replication client may concatenate the full path name associated with the parent inode with the file name associated with the file object, which may be passed to the replica host to replicate the change in the replica file system. On the other hand, if the cache does not contain the full path name associated with the parent inode, the replication client may perform the reverse path lookup to obtain the grandparent inode, which may then be traversed to obtain the full path name associated with the parent inode and build the appropriate mapping. In response to building the appropriate mapping, the replication client may then similarly concatenate and pass the full path name and file name to the replica host to replicate the changes.

According to one aspect of the invention, the system and method described herein may therefore use reverse path lookups to determine the ancestry and full path information associated with the inode represented with any suitable file handle to substantially simplify replicating the master file system and address issues that may arise if no component other than the master host could correctly interpret the file handles. For example, the reverse path lookup techniques may enable the replication client to record all operations that the master host performs on the master file system according to the full path name associated with any files that the operations change, whereby the changes can be logged, analyzed, and applied on the remote replica host. Moreover, because the operations that change the files in the master file system are tracked with the full path name, one or more filters may be defined to configure whether to record and replicate certain operations or whether to discard such operations from recordation and replication, while caching the file handle to the full path name mappings may substantially eliminate or reduce the need to read the master file system to obtain the appropriate inode information associated with a file object to be replicated. The reverse path lookup may therefore operate somewhat distinctly from forward path lookups, which generally initiate traversals at the ROOT directory or PWD (print working directory) to find top-down path information. In contrast, the reverse path lookup described herein initially locates a file name corresponding to an inode number and then locates the inode within the parent directory to obtain the bottom-up full path name. Consequently, the system and method described herein may employ forward path lookups, reverse path lookups, or both to perform synchronization and replication operations because forward path lookups and reverse path lookups can each benefit from the search results that the other obtains.

DETAILED DESCRIPTION

Figure 1:
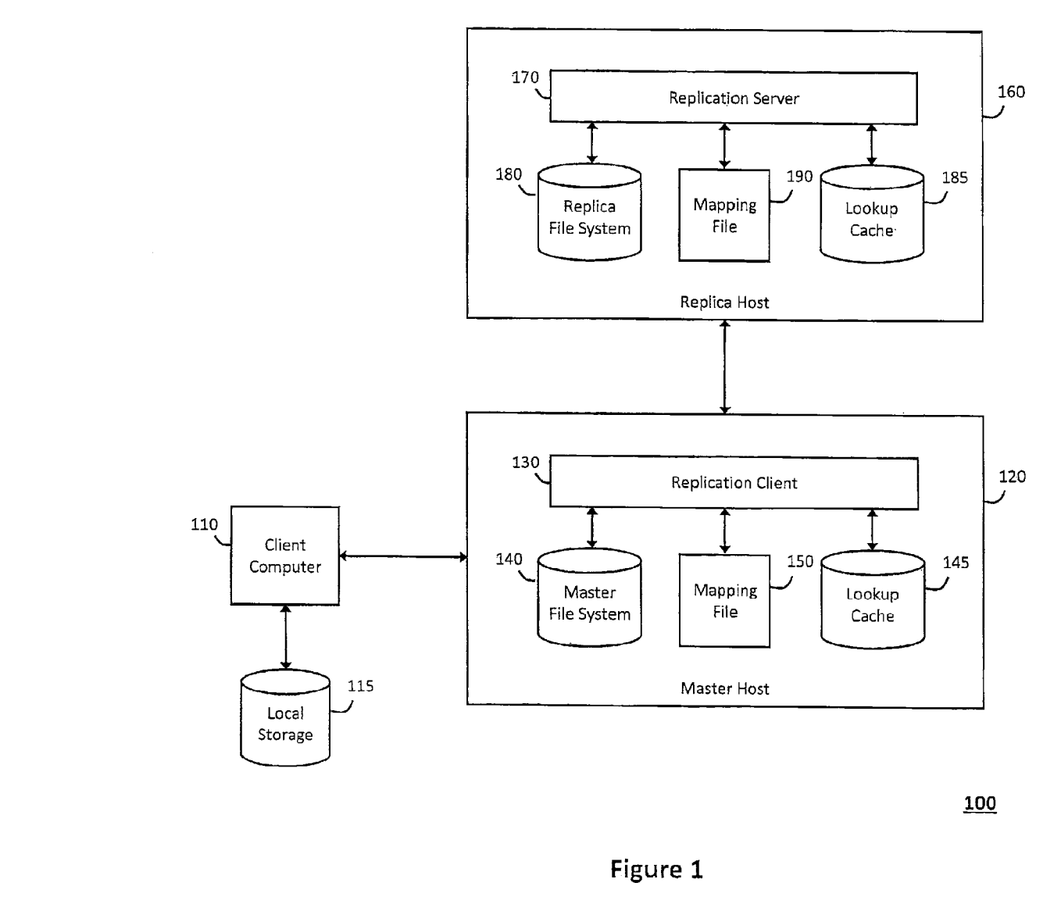
FIG. 1 illustrates an exemplary system for network file system server replication using reverse path lookup, according to one aspect of the invention.

According to one aspect of the invention, FIG. 1 illustrates an exemplary system 100 for network file system server replication using reverse path lookup. In particular, the system 100 illustrated in FIG. 1 may include a master host 120 that uses reverse path lookups to build mappings between file handles that represent file objects in a master file system 140 and full path names associated with the file objects in the master file system 140. Further, the master host 120 may use the mappings to distinguish hard links that relate to different file objects that have the same identifier in the master file system 140 despite having different parents or different file names. As such, the master host 120 may then store the mappings between the file handles and the full path names may in a lookup cache 145, and may further store any information that can distinguish the hard links in the lookup cache 145 to enable replicating changes to the master file system 120. For example, a client computer 110 may communicate with the master host 120 to transparently and remotely access the master file system 140, which the master host 120 may share with one or more additional client computers (not shown). As such, the client computer 110 may then mount directory trees associated with the master file system 140 within local storage 115, wherein the client computer 110 and the master host 120 may then jointly perform operations on the master file system 140 mounted within the local storage 115 (e.g., the master host 120 may pass file handles that represent file objects in the master file system 140 to the client computer 110, which then uses the file handles and information mounted in the local storage 115 to perform operations on the master file system 140 jointly with the master host 120). The master host 120 may then track activity that relates to the client computer 110 operations on the master file system 140 to detect changes to one or more file objects within the master file system 140 and replicate the changes on a replica host 160.

In one implementation, to replicate the changes on the replica host 160, the system 100 may validate consistency between the master file system 140 and a replica file system 180 that the replica host 160 maintains to provide a copy associated with the master file system 140 and ensure that the master file system 140 can be immediately accessed in emergency or other failure scenarios that require substantially instantaneous failover and restoration in response to loss or disruption associated with the master file system 140. For example, in response to the client computer 110 applying one or more changes to one or more file objects within the master file system 140, the master host 120 may invoke a replication client 130 to record metadata describing the changes in a journal file, which may be sent to the replica host 160 to replicate the changes in the replica file system 180 via a replication server 170 that executes on the replica host 160. Furthermore, in one implementation, the changes applied to the master file system 140 and the replica file system 180 may be recorded in a rewind log to preserve a context that can be used to rewind or otherwise undo the changes within the master file system 140 and the replica file system 180 or locate a switch point on the replica file system 180 that can be used to suitably resume business operations in response to a disaster or other failure associated with the master file system 140. In one implementation, further detail relating to techniques that may be used to replicate the changes between the master file system 140 and the replica file system 180 and/or rewind or otherwise undo the replicated changes may be described in U.S. patent application Ser. No. 10/981,837, entitled "Replicated Data Validation," filed Nov. 5, 2004, which issued as U.S. Pat. No. 7,840,535 on Nov. 23, 2010 and U.S. patent application Ser. No. 13/043,201, entitled "System and Method for Providing Assured Recovery and Replication," filed Mar. 8, 2011, the contents of which are hereby incorporated by reference in their entirety.

In one implementation, as will be described in further detail herein, the master host 120 may use various mechanisms to represent the file objects managed within the master file system 140 and ensure the replica file system 180 and the master file system 140 have a consistent state that permits the above-described replication and rewind operations. For example, as noted above, the master host 120 generally passes one or more file handles that represent the file objects in the master file system 140 to the client computer 110, which uses the file handles to perform any subsequent operations on the file objects. In particular, the file handles may generally contain all the information that the master host 120 needs to distinguish an individual file object, including inode numbers that identify the file objects, inode generation numbers that provide version controls over the file objects, device identifiers that provide locations where the file objects reside, and parent information associated with the file objects if the master file system 140 has been configured to maintain the parent information. However, the file handles are generally opaque to the client computer 110, which stores the file handles in the local storage 115 to be used in subsequent operations on the file objects that the file handles represent (i.e., only the master host 120 can correctly interpret the contents associated with the file handles).

As such, in response to the client computer 110 sending changes associated with one or more file handles to the master host 120, the master host 120 may interpret the file handles to apply the changes to the file objects that the file handles represent. Accordingly, in order to replicate the changes in the replica file system 180, the master host 120 may generate information that the replica host 160 can use to interpret the file handles and replicate the changes on the represented file objects. For example, in response to the client computer 110 communicating a file handle to the master host 120 to change a file object that the file handle represents, the master host 120 may initially use the file handle to find the inode in the master file system 140 that corresponds to the file handle. However, as noted above, the inode does not have information that suitably identifies a full path name associated with the file object. As such, in one implementation, the master host 120 may use a reverse path lookup on the inode number associated with the file object to determine the parent inode and the full path name associated with the file object, which the master host 120 may add to the file handle in order to permit the replica host 160 to correctly interpret the file handle and replicate the change in the replica file system 180.

For example, as described in "NFS: Network File System Version 3 Protocol Specification," which was incorporated by reference above, any file object that represents a current directory within the master file system 140 will contain an entry named ". ." that provides an alias pointing to the parent directory associated with the current directory. As such, the master host 120 may simply read the ". ." entry to obtain the parent inode associated with any file object that represents a current directory and then traverse the parent directory to find the name associated with the current directory, which can also be considered the child associated with the parent directory. Furthermore, the master host 120 may iteratively or recursively perform the reverse path lookup in the same or a substantially similar to find all ancestry information associated with the current directory (e.g., if the master host 120 locates a ". ." entry in the parent directory, that ". ." entry may be read to obtain the grandparent associated with the current directory, any additional children associated with the grandparent, etc.). In this manner, the master host 120 may determine a translation between the inode number and the full path name associated with the current directory in addition to translations between inode numbers and full path names associated with any other directories in order to determine the full directory structure associated with the master file system 140.

In one implementation, the master host 120 may then store the translations between the directory inode numbers and the directory full path names in the lookup cache 145, which may be referenced to determine the full path name that any file object has in the master file system 140 and thereby enable replication operations. In particular, although a file handle that represents a regular (i.e., non-directory) file does not have a corresponding ". ." entry in the inode, the reverse path lookup may be used to determine the parent associated with the file inode in the same or a substantially similar manner to a directory inode. For example, the "NFS: Network File System Version 3 Protocol Specification" provides that any file named "." may be assumed to provide an alias pointing to the current directory (i.e., the directory that contains the file), whereby the master host 120 may similarly read the "." entry to obtain the parent inode number associated with any file object that represents a regular file. In this manner, the master host 120 may similarly determine a mapping between the inode number associated with the current file and the parent inode number associated with the current file, which may then be stored in the lookup cache 145 and subsequently referenced to obtain the inode number to parent inode number mapping and perform replication operations.

In one implementation, the master host 120 may build the inode number to parent inode number mapping into a data structure that can then be stored within a mapping file 150 to improve response time associated with subsequent replication operations. In particular, whenever the master host 120 invokes the replication client 130 to initiate replicating or otherwise synchronizing content associated with a directory in the master file system 140 to the replica host 160, the master host 120 may read the inode numbers and parent inode numbers associated with all regular files contained within the directory from the lookup cache 145 and write the inode number to parent inode number pairs to the mapping file 150. In one implementation, the master host 120 may generally maintain various mapping files 150 that each correspond to a particular device in the system 200, whereby all data within a particular mapping file 150 may have the same device identifier. As such, every time that the replication client 130 tracks an operation that changes one or more file objects in the master file system 140, the replication client 130 may check the file handle associated with the file objects against the appropriate mapping file 150 (i.e., based on the device identifier contained in the file handle) and return the file inode number to parent inode number pairs associated with the file objects. As such, in one implementation, the master host 120 may cache contents associated with the mapping files 150 (or portions thereof) in the lookup cache 145 to improve response time associated with the process to read the inode number to parent inode number pairs, wherein the data structure used to cache the contents associated with the mapping files 150 (or the portions thereof) may include a binary balance tree, commonly referred to as a B-tree, to allow the replication client 130 to conduct searches quickly. In particular, the file inode number and device identifier or file system identifier may provide a search key into the B-tree, which sorts data in a manner that allows searches in logarithmic amortized time.

Furthermore, as will be described in further detail herein, the system 200 may support hard links during synchronization and replication to preserve file type and data content as-is in the replica file system 180, which may ensure that any hard linked files in the master file system 140 will be hard linked in the replica file system 180 subsequent to the synchronization and replication operations completing. In addition, if the system 200 has been configured to enable the data rewinding mechanisms noted above, the replication client 130 may capture events that relate to operations on the hard linked files during replication to ensure that when the replication server 170 replicates the hard linked files, corresponding undo journal events will also be created to rewind the events on the replicated hard linked files. As such, to enable synchronization and replication operations on any hard links that arise due to different files having the same inode number but different parents or names, the master host 120 may attempt to distinguish the hard linked files. In particular, the master host 120 may initially determine whether the hard linked files reside in different directories, in which case the inode number to parent inode number pairs associated with the hard linked files may be sufficient to distinguish the hard linked files (i.e., because the hard linked files would have different parent inode numbers that represent the different directories). However, if the hard linked files reside in the same directory, the inode number to parent inode number pairs would be insufficient to distinguish the hard linked files because the parent inode numbers would identify the same parent directory. Accordingly, to distinguish hard linked files that reside in the same directory, the master host 120 may add file names associated with the hard linked files to the entries in the mapping file 150 that include the inode number to parent inode number pairs, whereby entries in the mapping file 150 relating to hard linked files that reside in the same directory may include inode numbers, parent inode numbers, and file names in order to represent the hard linked files in three dimensions and thereby distinguish the hard linked files. Furthermore, any nodes in the B-tree that correspond to inode numbers shared among multiple hard linked files may have a list that contains all the hard links to simplify searches during replication.

In one implementation, as noted above, the master host 120 may initiate a replication operation in response to receiving a request to apply one or more changes to a file object from the client computer 110, which may include the file handle associated with the file object to identify the file object associated with the changes. In response thereto, the replication client 130 may track all operations that the master host 120 performs on the master file system 140 and use the inode number and device (or file system) identifier associated with the file handle to search the B-tree. In response to finding a node corresponding to the inode number, the replication client 130 may then return the parent inode number and file name associated with the file handle and check whether the parent inode number has been stored in the lookup cache 145. In response to determining that the parent inode number has been cached, the replication client 130 may then determine whether the cached information associated with the parent inode number includes the full path name associated therewith. In one implementation, if the lookup cache 145 contains the parent inode number and the full path name associated therewith, the replication client 130 may then concatenate the full path name associated with the parent inode with the file name associated with the file object associated with the changes and pass the concatenated path name and file name to the replica host 160, which may then invoke the replication server 170 to replicate the changes in the replica file system 180, the replica mapping file 190, and the replica lookup cache 185. On the other hand, if the lookup cache 145 does not contain the full path name associated with the parent inode, the replication client 130 may read the ". ." entry in the parent inode to obtain the grandparent inode, which may then be traversed to obtain the full path name associated with the parent inode and build the appropriate inode number to full path name mapping. In one implementation, in response to building the appropriate inode number to full path name mapping, the replication client 130 may then similarly concatenate and pass the full path name and file name to the replica host 160, which may then invoke the replication server 170 to replicate the changes.

Accordingly, the above techniques that use reverse path lookups to determine the parent and full path information associated with an inode represented with a particular file handle may substantially simplify replicating changes to the master file system 140 and address the issues that would arise due to only the master host 120 having the capability to correctly interpret the file handles. For example, using the reverse path lookup techniques to handle replicating the master file system 140 enable the replication client 130 to track all operations that the master host 120 performs to change files in the master file system 140 with the full path name associated with the changed files, whereby the changes can be logged, analyzed, and applied to the replica file system 180 on the remote replica host 160. Moreover, because the operations that change the files in the master file system 140 are tracked with the full path name, the replication client 130 can be configured with one or more filters that define whether or not certain operations should be recorded and replicated, while storing the mappings between the file handles and the full path names in the lookup cache 145 may substantially eliminate or reduce the need to read the master file system 140 in order to obtain the inode information associated with a file object. The reverse path lookup may therefore operate somewhat distinctly from forward path lookups, which generally begin traversals at the ROOT directory or PWD (print working directory) to find top-down path information corresponding to an inode. In contrast, the reverse path lookup described above initially locates a file name corresponding to a file inode number in the mapping file 150 and then locates the inode within the parent directory to obtain the full path from the bottom-up. Consequently, in one implementation, the system 200 may employ forward path lookups, reverse path lookups, or both because forward path lookups and reverse path lookups can each benefit from the search results that the other can obtain.

Figure 2:
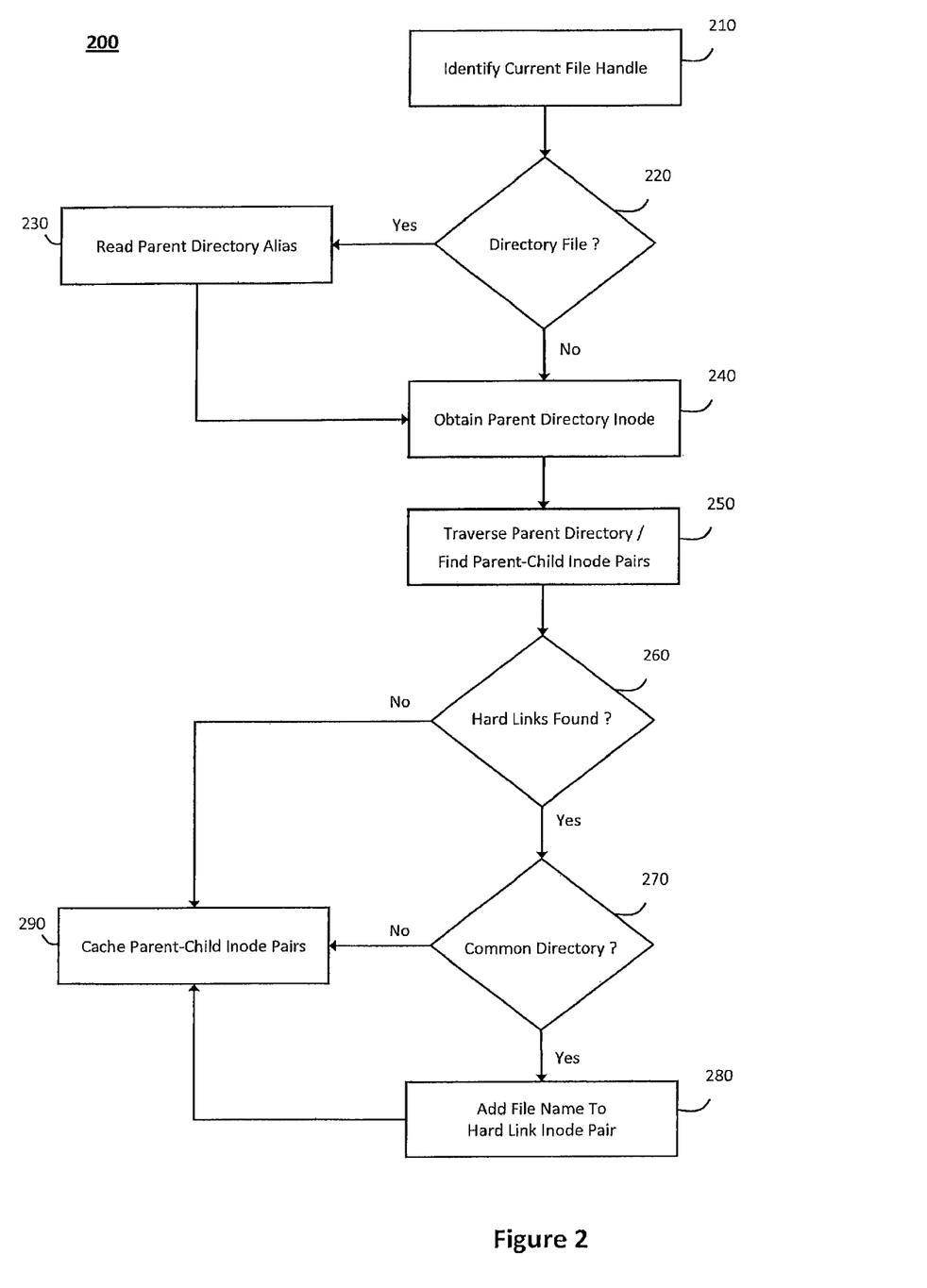
FIG. 2 illustrates an exemplary method for using reverse path lookup to build a mapping between file handles that represent file objects in a network file system and full path names associated with the file objects, according to one aspect of the invention.

According to one aspect of the invention, FIG. 2 illustrates an exemplary method 200 for using reverse path lookup to build a mapping between file handles that represent file objects in a network file system and full path names associated with the file objects. In particular, the method 200 illustrated in FIG. 2 may include a master host using a reverse path lookup to build a mapping between file handles that represent file objects in a master file system and full path names that the file objects have in the master file system.

Further, the master host may use the mappings to distinguish hard links that relate to different file objects having the same inode number in the master file system while having different parent inodes or different file names. As such, the method 200 may be used to determine mappings between file handles and full path names associated therewith and distinguish hard links to enable replicating the master file system. In one implementation, the method 200 may operate in relation to a client computer communicating with the master host to mount directory trees associated with the master file system within local storage to remotely access the master file system, wherein the client computer and the master host may then jointly perform operations on the master file system (e.g., the master host may pass file handles that represent file objects in the master file system to the client computer, which then uses the file handles and information mounted in the local storage to jointly perform the operations on the master file system with the master host).

For example, in one implementation, the client computer may receive one or more file handles that represent the file objects in the master file system from the master host and then use the file handles to perform any subsequent operations on the file objects. Although the file handles generally contain all the information that the master host needs to distinguish individual file objects (e.g., inode numbers, inode generation numbers, device or file system identifiers, etc.), the file handles are generally opaque to the client computer. As such, to perform an operation on a particular file in the master file system, the client computer may send one or more changes associated with a current file handle that represents the particular file to the master host, wherein an operation 210 may include the master host identifying or otherwise interpreting the current file handle to apply the changes to the particular file that the current file handle represents. To replicate the changes in the replica file system, the master host may then generate information that the replica host can use to similarly interpret the current file handle and replicate the changes. For example, in response to the client computer communicating the current file handle to the master host, operation 210 may include the master host initially using the current file handle to find a current inode that corresponds to the file current file handle within the master file system and then perform a reverse path lookup on the current inode number to determine the parent inode and full path name associated with the current file handle to enable the replica host to correctly interpret the current file handle and replicate the changes.

In particular, the reverse path lookup may include the master host determining whether the current file handle represents a directory file or a regular (i.e., non-directory) file in an operation 220. For example, the master host may locate the inode corresponding to the current inode number to find the file name associated with the current file handle, whereby operation 220 may include the master host inspecting the inode to determine whether the current inode represents a directory file. In particular, a directory file will typically contain an entry named "." that points to the parent directory associated with the directory file, whereby the master host may determine that the current inode represents a directory file in operation 220 if the current inode contains a ". ." entry. As such, in response to determining that the current inode represents a directory file, an operation 230 may include the master host reading the ". ." alias to the parent directory and then obtaining the parent directory inode in an operation 240. In one implementation, the master host may then traverse the parent directory in an operation 250 to find the name associated with the directory file represented with the current file handle, which may also be considered the child inode associated with the parent directory inode. Furthermore, operation 250 may include the master host iteratively or recursively performing the reverse path lookup in the same or a substantially similar to find all ancestry information associated with the directory file represented with the current file handle (e.g., if the master host locates a ". ." entry in the parent directory, that ". ." entry may be read to obtain the grandparent associated with the current directory, any additional children associated with the grandparent, etc.). As such, the master host may determine a translation between the current file handle and the inode number and full path name associated therewith in addition to inode numbers and full path names associated with any other directory files in the ancestry associated with the directory represented in the current file handle.

Alternatively, in response to the master host determining that the current inode represents a regular (i.e., non-directory) file in operation 220, the master host may nonetheless determine the parent inode associated with the regular file in the same or a substantially similar manner to that described above in relation to directory files. For example, if the current inode represents a regular file, operation 240 may include the master host inspecting the current inode to locate an entry named "." that points to the current directory (i.e., the directory that contains the regular file). As such, the master host may similarly read the "." entry to find the inode corresponding to the current directory that contains the file, which represents the parent directory associated with the file. In this manner, the master host may similarly traverse the parent directory associated with the current inode in operation 250 to determine a mapping between the current inode number and the parent inode number associated with the file.

In one implementation, in response to determining the parent inode number to current inode number pair that represents the full path associated with the current file handle, the master host may determine whether any hard links are associated with the current file handle. In particular, an operation 260 may include the master host determining whether the current file handle one or more additional file handles share the same inode number despite having different parent inodes or different names. If no other file handles share the inode number associated with the current file handle, the master host may then cache the pairing between the current inode number and the parent inode number associated with the current file handle in an operation 290, which may subsequently be referenced to obtain the current inode number to parent inode number pairing and thereby provide the full path name associated with the current file handle to enable replication operations on the current file handle. For example, the pairing may be cached within a data structure that can improve response time associated with the subsequent replication operations (e.g., a B-tree that sorts data in a manner that allows searches to be conducted in logarithmic amortized time).

Otherwise, if operation 260 results in the master host determining that the current file handle and one or more other file handles share the same inode number and therefore represent hard linked files, the master host may then determine whether the hard linked files reside in different directories in an operation 270. In particular, if the hard linked files reside in different directories, the current inode number to parent inode number pairing may sufficiently distinguish the hard linked files because the hard linked files would have different parent directories and therefore parent inode numbers. As such, in one implementation, the master host may simply cache the pairing between the current inode number and the parent inode number in operation 290 if the hard linked files reside in different directories. However, if the hard linked files reside in a common (i.e., the same) directory, the current inode number to parent inode number pairing would not provide enough information to distinguish the hard linked files because the hard linked files have the same parent directory and therefore the same parent inode number. Accordingly, in response to determining that the hard linked files reside in the same directory, an operation 280 may include the master host adding file names associated with the hard linked files to the current inode number to parent inode number pairings to represent the hard linked files in three dimensions (i.e., with the current inode number, the parent inode number, and the file names) thereby distinguish the hard linked files. Furthermore, the master host may similarly cache the three-dimensional representation associated with the hard linked files in operation 290 to provide information that can be referenced to perform subsequent replication operations on the hard linked files.

Figure 3:
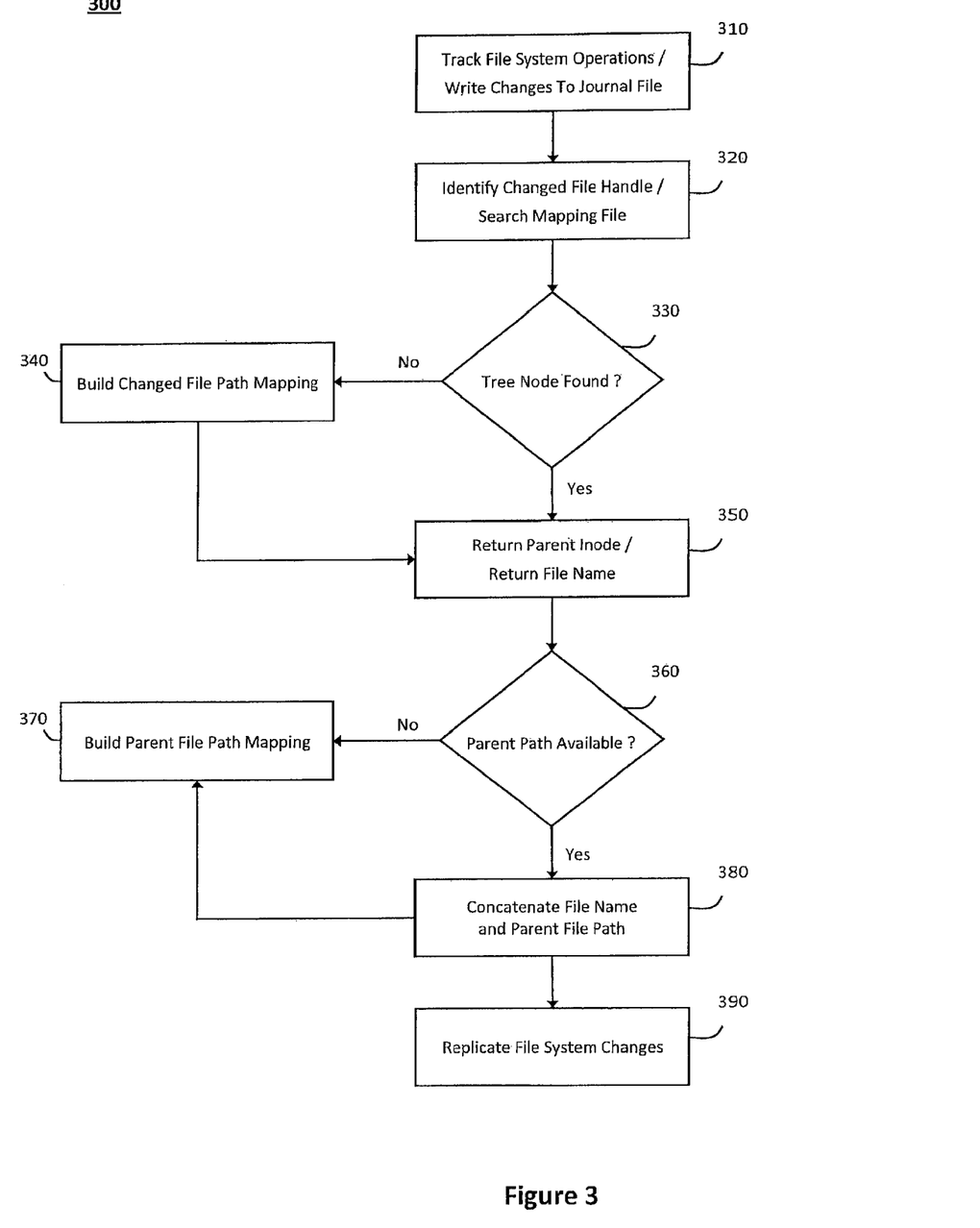
FIG. 3 illustrates an exemplary method for using reverse path lookup to replicate changes to file objects in a network file system, according to one aspect of the invention.

According to one aspect of the invention, FIG. 3 illustrates an exemplary method 300 for using reverse path lookup to replicate changes to file objects in a network file system. In particular, the method 300 illustrated in FIG. 3 may include the master host referencing the cached mappings between file handles and full path names associated with file objects in the master file system. Further, the master host may use the cached mappings to distinguish hard links that relate to different file handles having the same inode number based on the full path names and/or file names associated with the file handles. In one implementation, the method 300 shown in FIG. 3 may operate in relation to a client computer communicating with the master host to apply a change to a particular file object, wherein the client computer may pass a file handle that represents the particular file object to the master host, which then interprets the file handle to apply the change. As such, an operation 310 may include a replication client that executes on the master host tracking operations that the master host and client computer jointly perform on the master file system in a substantially continuously manner to detect any changes that the tracked operations apply to the master file system and write metadata describing the detected changes to a journal file. As will be described in further detail herein, the replication client may then reference the cached mappings to record the full path name associated with the file objects that were changed relative to the protected directory that contains the file objects (i.e., to enable replication in scenarios where the master host and the replica host may potentially store the file objects under different directories).

For example, in one implementation, the master host may apply one or more changes to a file object in the master file system in response to a request from the client computer that includes a file handle associated with the file object and a request to apply the changes. In response to the master host interpreting the file handle and applying the changes, the replication client may similarly interpret the file handle to determine the inode number and device (or file system) identifier associated with the file handle in an operation 320. In particular, the replication client may search a B-tree or other data structure that caches the information in the above-described mapping files in operation 320 and then determine whether the data structure contains a tree node corresponding to the file handle in an operation 330. In response to determining that the data structure does not contains a tree node corresponding to the file handle, the replication client may then initiate a reverse path lookup in an operation 340 to build a full path mapping between the inode number corresponding to the file handle and the ancestry information associated with the inode number (e.g., the parent inode number, grandparent inode number, etc.). For example, the reverse path lookup initiated in operation 340 may generally be performed in the same or a substantially similar manner to the techniques described above in relation to FIG. 2, which may be used to build mappings between file handles that represent file objects in a network file system and full path names associated therewith. Otherwise, if the replication client finds a tree node corresponding to the file handle in the data structure that caches information in the mapping files, an operation 350 may include the replication client returning the parent inode number and file name associated with the file handle and then checking whether the full path information associated with the parent inode number has been cached in an operation 360.

In one implementation, in response to determining that the full path information associated with the parent inode number has not been cached, the replication client may further initiate a reverse path lookup to build a full path mapping between the parent inode number and the ancestry information associated therewith, which may performed in the same or a substantially similar manner to operation 340. In either case, the replication client may then obtain the full path name associated with the parent inode number, either via retrieving the full path name from the cache in operation 360 or building the full path name in operation 370. In one implementation, the replication client may then concatenate the full path name associated with the parent inode number with the file name associated with the file object that was changed in an operation 380, wherein the concatenated full path name and file name may be written to the journal file and recorded with the metadata that describes the detected changes to the master file system. In one implementation, the replication client may then pass the journal file with the metadata describing the detected changes and the concatenated full path name and file name to the replica host in an operation 390, wherein the replica host may then read the information in the journal file to interpret the file handle associated with the changes and thereby replicate the changes in the replica file system.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system configured to replicate a network file system, the system comprising:
    a master file system;
    a master host having a hardware processor system configured to:
        receive a request to apply a change to the master file system, and receive a file handle that represents an object associated with the change to the master file system;
        interpret the file handle to determine the object that the file handle represents, apply the change to the object within the master file system, and determine a full path name that the object has within the master file system based on parent data that the object has within the master file system; and
        transmit metadata that describes the change to the master file system and a mapping between an inode number that identifies the object within the master file system and the full path name associated with the object, to a replica host configured to replicate the change using the mapping and the metadata.

2. The system of claim 1, further comprising a cache configured to store the mapping between the inode number and the full path name, wherein the processor system is configured to reference the cached mapping to enable replication of the change to the object.

3. The system of claim 1, wherein the processor system is further configured to:
    inspect an inode corresponding to the inode number that identifies the object to determine whether the object represents a directory or a file within the master file system; and
    read an entry in the inode that points to a parent directory associated with the inode in response to determining that the object represents a directory, wherein the parent directory represents the parent data that the directory object has within the master file system.

4. The system of claim 1, wherein the processor system is further configured to:
    inspect an inode corresponding to the inode number that identifies the object to determine whether the object represents a directory or a file within the master file system; and
    read an entry in the inode that points to a current directory that contains the inode in response to determining that the object represents a file, wherein the current directory represents the parent data that the file object has within the master file system.

5. The system of claim 1, wherein the processor system is configured to retrieve the mapping between the inode number and the full path name from a device-specific mapping file based on a device identifier or file system identifier associated with the file handle.

6. The system of claim 1, wherein the processor system is configured to store the mapping between the inode number and the full path name in a binary balance tree.

7. The system of claim 1, wherein the processor system is further configured to distinguish a hard link associated with the object in response to determining that another object having different parent data or a different file name, from the object shares the inode number that identifies the object.

8. The system of claim 7, wherein the processor system is configured to use the mapping between the inode number and the full path name associated with the object to distinguish the hard link if the object and the other object reside in different directories.

9. The system of claim 7, wherein the processor system is configured to add the file names associated with the object and the other object to the mapping between the inode number and the full path name associated with the object to distinguish the hard link if the object and the other object reside in a common directory.

10. A method to replicate a network file system, the method comprising:
    receiving, at a master host, a request to apply a change to a master file system, wherein the request includes a file handle that represents an object associated with the change to the master file system;
    interpreting the file handle to determine the object that the file handle represents at the master host, wherein the master host interprets the file handle to apply the change to the object within the master file system and determine a full path name that the object has within the master file system based on parent data that the object has within the master file system; and
    transmitting metadata that describes the change to the master file system and a mapping between an inode number that identifies the object within the master file system and the full path name associated with the object, from the master host to a replica host, wherein the replica host replicates the change using the transmitted mapping and the transmitted metadata.

11. The method of claim 10, wherein the mapping between the inode number and the full path name is cached and a replication client executing on the master host references the cached mapping to enable replication of the change to the object.

12. The method of claim 10, further comprising;
    inspecting an inode corresponding to the inode number that identifies the object to determine whether the object represents a directory or a file within the master file system; and
    reading an entry in the inode that points to a parent directory associated with the inode in response to determining that the object represents a directory, wherein the parent directory represents the parent data that the directory object has within the master file system.

13. The method of claim 10, further comprising:
    inspecting an inode corresponding to the inode number that identifies the object to determine whether the object represents a directory or a file within the master file system; and reading an entry in the inode that points to a current directory that contains the inode in response to determining that the object represents a file, wherein the current directory represents the parent data that the file object has within the master file system.

14. The method of claim 10, further comprising retrieving the mapping between the inode number and the full path name from a device-specific mapping file based on a device identifier or file system identifier associated with the file handle.

15. The method of claim 10, wherein the mapping between the inode number and the full path name is stored in a binary balance tree.

16. The method of claim 10, further comprising distinguishing a hard link associated with the object in response to the master host determining that another object having different parent or a different file name, from the object shares the inode number that identifies the object.

17. The method of claim 16, wherein the master host uses the mapping between the inode number and the full path name associated with the object to distinguish the hard link if the object and the other object reside in different directories.

18. The method of claim 16, wherein the master host adds the file names associated with the object and the other object to the mapping between the inode number and the full path name associated with the object to distinguish the hard link if the object and the other object reside in a common directory.

19. A computer program product comprising:
a non-transitory computer readable storage medium comprising computer-readable program code executable by a hardware processor embodied therewith to replicate a network file system, the computer readable program code comprising:

computer readable program code configured to receive, at a master host, a request to apply a change to a master file system, wherein the request includes a file handle that represents an object associated with the change to the master file system;

computer readable program code configured to interpret the file handle to determine the object that the file handle represents at the master host, wherein the master host interprets the file handle to apply the change to the object within the master file system and determines a full path name that the object has within the master file system based on parent data that the object has within the master file system; and computer readable program code configured to transmit metadata that describes the change to the master file system and a mapping between an inode number that identifies the object within the master file system and the full path name associated with the object, from the master host to a replica host, wherein the replica host replicates the change using the transmitted mapping and the transmitted metadata.

20. The computer program product of claim 19, wherein the computer readable program code is further configured to build, at the master host, the mapping between the inode number that identifies the object within the master file system and the full path name associated with the object.

* * * * *